United States Patent [19]

Satoh

[11] Patent Number: 4,765,682
[45] Date of Patent: Aug. 23, 1988

[54] LOCK UNITS

[75] Inventor: Seiki Satoh, Utsunomiya, Japan

[73] Assignee: Mitsui Kinzoku Kogyo Kabushiki Kaisha, Tokyo, Japan

[21] Appl. No.: 77,853

[22] Filed: Jul. 27, 1987

[30] Foreign Application Priority Data

Jul. 31, 1986 [JP] Japan .............................. 61-180896

[51] Int. Cl.⁴ ............................................. B60N 1/02
[52] U.S. Cl. .................................................... 297/379
[58] Field of Search ....... 297/379; 292/216, DIG. 73, 292/341.12

[56] References Cited

U.S. PATENT DOCUMENTS

| 3,371,948 | 3/1968 | Velavicius | 292/341.12 |
| 3,592,496 | 7/1971 | Ploughman | 292/216 |
| 3,614,146 | 10/1971 | Marx | 292/216 |
| 3,767,243 | 10/1973 | Yoshimura | 292/216 |
| 3,773,368 | 11/1973 | Atwood et al. | 292/216 |
| 4,637,648 | 1/1987 | Okino et al. | 297/379 |

FOREIGN PATENT DOCUMENTS 3505047 6/1986 Fed. Rep. of Germany ...... 297/379

Primary Examiner—Francis K. Zugel
Attorney, Agent, or Firm—Stevens, Davis, Miller & Mosher

[57] ABSTRACT

A lock unit for use on automobile seats and the like of the type comprising a latch engageable with a stationary striker, and a ratchet engageable with the latch for retaining the striker in a first, confined position in the lock unit. In a second position of the latch, the latch is released from the ratchet, and the striker is freed. The lock unit has a wedge member whose movement is coupled with the movement of the ratchet into and out of engagement with the latch. The wedge member is urged resiliently to engage one side of the striker while the striker is subject to the binding action by the latch on its opposite side. Accordingly, loosening, chattering and rattling of the striker are suppressed. When the ratchet is moved out of engagement with the latch, the wedge member is moved away from the latch and the striker.

7 Claims, 2 Drawing Sheets

LOCK UNITS

FIELD OF THE INVENTION

This invention relates generally to improvements in and relating to lock units. More specifically, it relates to locking means, for example for use in automotive vehicle seats, tail gates, side doors and the like.

PRIOR ART

A best example of prior art to which the present invention relates, is a lock unit provided on each seat back of a plurality of seating units, each comprising a seat to which said seat back is pivotably mounted and turnably onto the seat proper. When the seat back is kept in the upright, normal service position, the lock unit is kept in locked position by engagement with a stationary striker. In this normal service position of the lock unit, the striker is held firmly at the most advanced, locking position, by engagement with a turnable latch. The latch is being held at the desired locking position by engagement with a turnable ratchet. The ratchets position is externally controllable by a manually operable operating rod, as will be more specifically described hereinafter with reference to FIGS. 7 and 8.

For release of the lock unit from the locking position, the operating rod is pulled upwards, turning the ratchet in the lock-releasing direction allowing the matic return of the mating latch in the unlocking direction, thereby freeing the striker from the locking position. When the seat back is tilted forward from its upright locked position, together with the lock unit, the striker is caused automatically to recede and disengage from the locking position.

For occasionally occurring loose positioning of the striker in the locking unit due to unavoidable machining errors or similar causes of the striker or related parts, it is a common practice to provide a cushioning rubber member within the interior of the casing of the lock unit. This rubber member squeezes the striker between the latch and the cushioning member for positively suppressing loose locking position of the striker. However, in practice, disadvantageous chattering and rattling of the striker has frequently experienced as due to wear and material aging of the cushioning member, especially appearing after a long period of practical service.

It is an object of the present invention to provide an improved lock unit for use, for example, with a pivotably foldable seating unit comprising a seat and a pivotable seat back, for practically suppressing loosening, chattering and rattling of the locking striker while it is held in locking position.

A further object of the invention is to provide an improved locking unit of the above kind, wherein the conventional cushioning rubber member has been eliminated.

For the fulfilment of the foregoing several objects, the inventive lock unit comprising:

a striker;

latch positioned at a first position engaging with the striker for binding it in the position for locking and at a second position in which the latch releases from the striker, freeing it from its bound position for unlocking purpose;

a ratchet arranged in close proximity to the latch, and is movable between a first locking position and a second unlocking position; at the first position, the ratchet engage the latch to retain it in the locking position; at the second position, the ratchet allows the latch to move towards its release position (keep) and a wedge member disposed for movement with the ratchet, receding from a striker binding position by the latch when it is held at the lock-releasing position and for advancing to engage the striker subjected to binding action by said latch and at the opposite side thereof to that where it engages the latch when the ratchet displaces to the locking position.

In the lock unit of the present invention, the striker may preferably be stationary, while the other parts of the lock unit are movable as a whole.

Further, the lock unit of the invention may be so arranged that the striker is mounted stationarily on a vehicle member, while the other parts of the lock unit are mounted on the pivotable seat back of the seating unit.

The lock unit of the present invention may further comprise a stationary housing having two separate pivots for rotatably mounting the ratchet and the latch, respectively.

The lock unit of the present invention may comprise a manually operable manipulating rod which is attached at its inner end pivotally to the ratchet.

These and further objects, features and merits of the invention will become more apparent as the description proceeds with reference to the accompanying drawings.

CONVENTIONAL COMPARABLE LOCK UNIT

Before setting forth a preferred embodiment of the present invention, a comparable comparative conventional lock unit will be illustrated with reference to FIGS. 7 and 8 in combination for better understanding of the invention.

Figure 7:
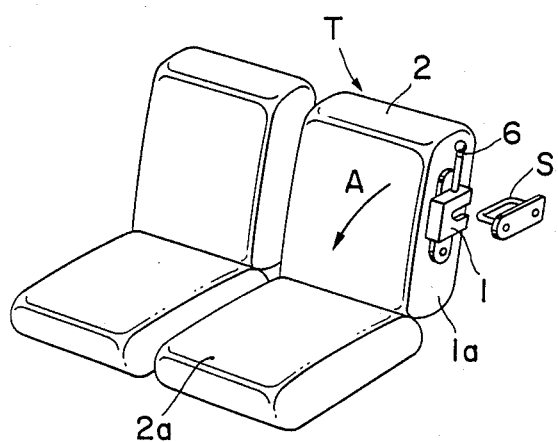
FIG. 7 is a perspective view of a pair of foldable seats, a lock unit provided on one of them being shown by its outline configuration.

In an automobile, as for example a station wagon, a plurality of seating sets as at T shown in FIG. 7 may be fitted, preferably in form of part or whole of an array arrangement. In FIG. 7, two sets T are shown. However, for better utilization thereof, additional sets may be installed for providing an additional and bed-like floor space serving for rest or provisional sleeping purposes, although not specifically shown.

The seating unit T consists of a seat 2a and seat back 2 pivotably connected therewith, as is commonly known, and a lock unit 1 is mounted on one of the side surfaces 1a of each of the seat back 2. In the upright position of the seat back, the unit 1 is held in engagement with a striker S which is permanently affixed at a proper position on the inside wall or like position in the automobile although not shown because the same is well known to those skilled in the art, thus the seat back is positively prevented from turning down onto the seat 2a.

Figure 8:
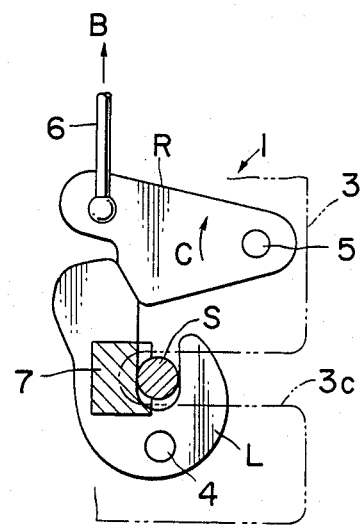
FIG. 8 is a front view of several main constituents of a conventional, comparable lock unit.

As suggested by FIG. 8, the essential parts of the unit 1 are contained within a stationary casing 3. A latch L is pivotably mounted on a stationary pivot pin 4 which is mounted on the casing 3. In the locking position of the lock unit, a ratchet R pivotably mounted on a stationary pivot pin 5 on the casing 3 is held in engagement with the latch L, causing the latch to be held in its locking position shown.

With the latch L held in the locking position, the striker S which is relatively advanced into the innermost position of the casing 3 through an elongated guide way 3c formed thereon is positively prevented from escaping and is held by the latch L.

When the operating rod 6 is pulled up manually in the direction of arrow B, rotating ratchet R in the direction C, latch L is allowed to turn clockwise in FIG. 8. This allows striker S to be freed from the locking position, allowing the seat back 2 to be turned manually as shown by an arrow A onto the seat bench 2a.

When the striker S is held in the locking position as shown in FIG. 8, a cushioning rubber member 7 must be provided as schematically shown within the inner space of casing 3, to suppress the otherwise occurring idling chatter and rattling between the locking striker S and various parts of the unit 1 by elastically squeezing it between latch L and cushioning member 7.

By the provision of such a cushioning member 7, the desired effect will be attained, as long as the cushioning member is new.

With repeated and continued use of the member, it deteriorates with a decrease in elasticity, and unavoidable wear. Chattering and rattling will then accordingly be generated.

PREFERRED EMBODIMENTS OF THE INVENTION

In the following, preferred embodiments will be described with reference to the drawings.

Figure 2:
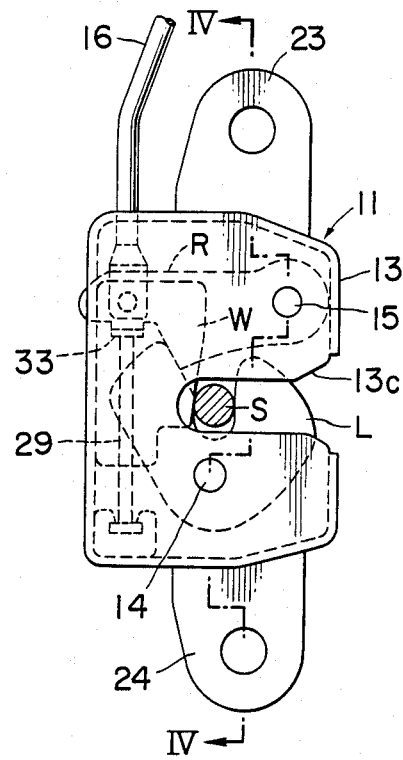
FIG. 2 is a front view of the lock unit as a whole.

In FIG. 2, numeral 11 represents the lock unit in general. This unit 11 includes a casing 13 which is formed with a recess 13c which serves as a guide passage for conventional striker S. Symbol R represents a ratchet which is rotatably mounted on a stationary pin 15 fixedly mounted on the casing 13.

Figure 3:
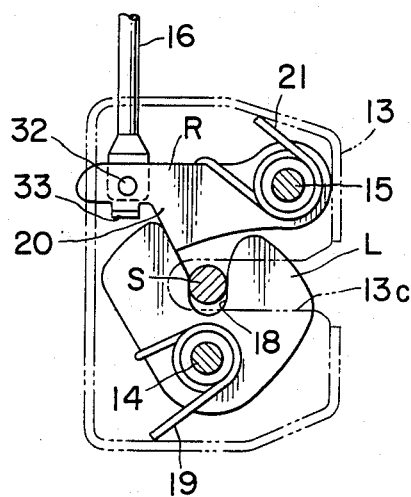
FIG. 3 is a similar view to FIG. 1, with the wedge member removed to allow a clearer view of the inner constituents.

As shown in FIG. 3, a latch L is formed with a recess 18 engageable with the striker S. This latch tends to turn clockwise therein under the action of a torsion spring 19. Ratchet R is formed with an engageable portion 20 which acts to hold latch L in the locking position as shown by contact therewith. For this purpose, ratchet R tends to turn counter clockwise by a torsion spring 21.

An operating rod 16, one end of which is pivotably connected at 32 to one end of ratchet R. Thus, when the operator pulls the rod 16 in the upward direction, ratchet R will turn clockwise due to the action of spring 21 around pivot pin 15, causing the engageable portion 20 of the ratchet to disengage from latch L which then turns clockwise, releasing striker S from its bound position, allowing striker S to escape.

Figure 4:
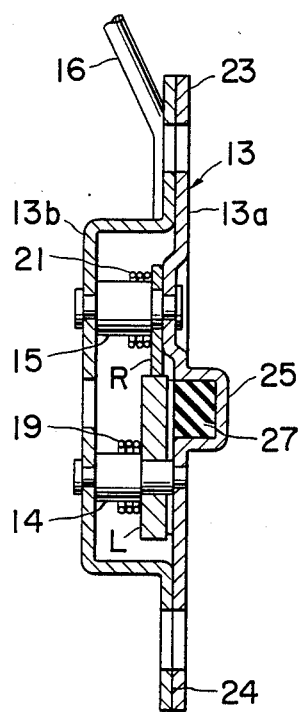
FIG. 4 is a longitudinal section taken substantially along the section line IV—IV in FIG. 2.

As shown in FIG. 4, casing 13 comprises a base plate member 13a and a cover member 13b of a box-like design. The upper and lower extensions of members 13a and 13b jointly from upper brackets 23 and lower bracket 24 which act as fixingly mounting means. As shown the fixed pins 14 and 15 provide mutual fixing means between base plate 13a and cover box 13b. Base plate 13a has a hollow projection 25 projecting in the opposite direction relative to the cover member 13b. The inside hollow space of projection 25 is filled with a cushioning member 27, which is made of rubber, as is cushion 7 shown in FIG. 7, to be described later. When the striker S is advanced to its innermost position, it is brought into light pressure contact with the cushioning member 27.

Figure 1:
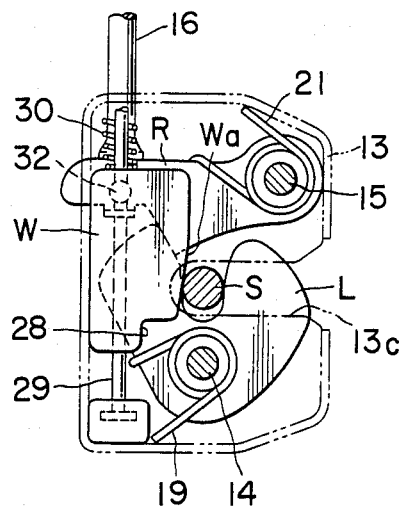
FIG. 1 is a front view of main constituents of the lock unit according to this invention, being shown in the locking position.
Figure 6:
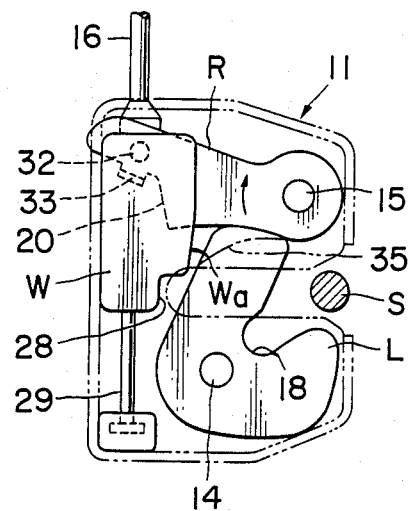
FIG. 6 is a similar view to FIG. 1, showing, however, the unlocking position of the lock unit.

As shown in FIG. 1, a wedge member W is provided at the side of latch L and ratchet R, which faces toward the cover member 13b. This wedge member is made of a somewhat elastic material such as preferably rubber, synthetic resin or the like, and has a general rectangular configuration, with an angular recess 28, at its lower right corner as shown in FIGS. 1, 2 and 6. Further, the wedge member W is formed with a tapered edge zone Wa, as most clearly be seen in FIGS. 1 and 6.

A guide rod 29 penetrates through the wedge member and is fixedly attached at its upper and lower ends to the case 13, thus the wedge member is along the guide rod 29. As most specifically shown in FIG. 5, an urging coil spring 30 between case 13 and wedge member W for urges the wedge member W downwards.

Figure 5:
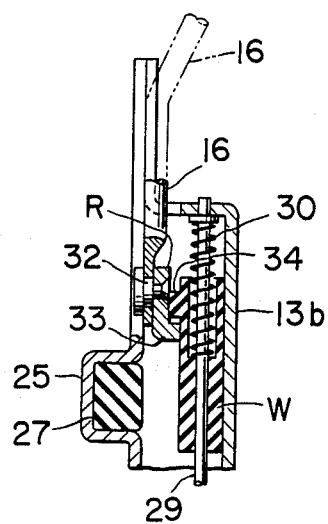
FIG. 5 is a similar view to FIG. 2, viewed, however, in the opposite direction as in FIG. 4.

As shown in the same FIG. 5, operating rod 16 is pivotably connected at its lower end to ratchet R near its tip end by a pin 32. Further, at the tip end of ratchet R is formed a flange- or hook-shaped portion 33, as shown in FIGS. 2, 3 and 6, which is engageable with the projection 34 of wedge member W from its underside.

Operation of the lock unit is described below.

The lock unit before engagement with striker S is shown in FIG. 6.

When striker S in the unengaged state starts to advance, latch L, at a released state, is rotated in the counter clockwise direction due to the motion of striker S. Ratchet R is also in the released state shown in FIG. 6, where wedge member W is kept at upwardly receded position from the entrance and receding guide passage of striker S as the result of foregoing engagement of engageable portion 33 with projection 34. Accordingly the striker S can advance along the guide passage till the innermost position thereof.

When the striker has arrived at such extreme position as above mentioned, latch L is brought into a position directly below the engageable portion 20 of ratchet R. Just at this point, ratchet R will rotate in the counter clockwise direction due to the action of spring 21, until the engageable portion 20 of ratchet R engages latch L which is thus rotated into its binding position, as shown in FIG. 3, which positively preventing any of the striker from escaping. In this way, the locking position of lock unit 11 is established and maintained.

In this state, wedge member W will be lowered into the position shown in FIG. 1, due to the progress of the downward movement of ratchet R. During this progress of movements, wedge member W by its tapered wedge proper Wa will fill the inner portion of the striker guide passage and in causing the striker to be firmly squeezed between latch L and wedge zone Wa, positively preventing loosening and rattling.

When operating rod 16 is manually pulled up in the locking position of the lock unit, wedge W is also moved upward to the position shown in FIG. 6 and ratchet R is moved upward towards the latch releasing position, causing latch L to be turned clockwise under the action of spring 19, freeing the striker S.

It will be clear from the foregoing description that when the lock unit is disengaged from striker S and the seat back 2 is rotated forward as shown by the arrow A, the wedge member W will be held at its highest possible position as shown in FIG. 6, resulting in the operating rod 16 protruding outwardly to the utmost degree. Therefore, in this case, the outer end of the operating rod may collide against certain part of the seat 2a, which could result in the seat's damage.

To avoid this result, the tip end of one arm of latch L, which cooperates with ratchet R, may be cut out as shown by dotted line 35 in FIG. 6. This measure allows the overly raised position of ratchet R in the unlocking position of the lock unit to be avoided. Accordingly, the projecting length of the operating rod 16 can be kept to a reasonable medium value.

In the foregoing embodiment of the invention, wedge member W performs a linear translational movement. However, in practice, this member can be modified to result in a rotational movement, as for example, in cooperation with the rotational movement of ratchet R and around a pivot pin, if desired. In addition, it should be understood that the present invention can be applied to the locking needs of any other instrument or machine, than seating or bedding.

The particular merits of the present invention will be briefly set forth below.

In the present invention, the wedge member is caused to advance and to be brought into engagement with the striker when it has advanced to its innermost position in the guide way. By contrast, the conventionally used cushioning member is always kept substantially at a set position and therefore is subject to sudden impacts by the advancing striker into its service position. Therefore, the conventional cushioning member will wear and give rise to rattling and other disadvantageous phenomena leading to loose positioning of the striker, which is an important aspect of the locking operation.

By contrast, the wedge member recedes from the striker guide passage, when the striker recedes from the locking position. Accordingly, the striker can enter and exit its locking position without hindrance or impact to the wedging or the like member.

What is claimed is:

1. A lock unit comprising:
   a striker;
   a latch movable between a first position in which the latch engages said striker for binding the same in a bound position against movement and a second position in which the latch releases said striker for allowing the same to move from said bound position;
   a ratchet disposed in close proximity to said latch and having an engageable portion, said ratchet being movable between a first position in which said engageable portion is caused to engage said latch to retain the latter in said first position and a second position in which said engageable portion is disengaged from said latch to allow the same to move to said second position;
   a wedge member having an edge zone and disposed for movement between an advanced position, in which said edge zone is engaged with said striker retained in said bound position at a side of the striker opposite to a side thereof engaged by the latch, for preventing chattering of the striker, and a retracted position in which the edge zone is away from said striker in the bound position;
   resilient means for urging said wedge member toward said advanced position; and
   an engaging means provided on said ratchet so as to be movable therewith, said engageable means being associated with said wedge member such that when the ratchet is caused to move toward its first position, the engaging means allows the wedge member to move to its advanced position under the force of said resilient means, and that when the ratchet is caused to move toward its second position, the engaging means engages the wedge member to cause the same to move to said retracted position against the force of said resilient means.

2. The lock unit of claim 1, further comprising a manually operable manipulating rod attached pivotally to said ratchet for moving the same between its first and second positions.

3. The lock unit of claim 1 wherein said wedge member has a projection engageable with said engageable means when the ratchet is caused to move toward its second position.

4. The lock unit of claim 3 wherein said engaging means is a flange- or hook-shaped portion formed on the ratchet.

5. The lock unit of claim 1, further comprising a stationary guide rod passing through said wedge member in the direction of movement of the wedge member.

6. The lock unit of claim 1 wherein said edge zone has a tapered surface.

7. The lock unit of claim 1 wherein said wedge member is made of a resilient material.

* * * * *